United States Patent [19]
Brown et al.

[11] 3,802,306
[45] Apr. 9, 1974

[54] SHEET APPARATUS FOR TRANSVERSELY CUTTING AN ADVANCING SHEET

[75] Inventors: Roy Alan Brown, Solihull; Robert Edmund Wilson, Wigan, both of England

[73] Assignee: Pilkington Brothers Limited, Liverpool, England

[22] Filed: Oct. 18, 1972

[21] Appl. No.: 298,694

[30] Foreign Application Priority Data
Oct. 20, 1971 Great Britain .................... 48821/71

[52] U.S. Cl. ............................. 83/12, 83/11, 83/76, 83/295, 83/326, 83/362, 83/369, 83/370, 83/486.1, 83/487
[51] Int. Cl. ............................................ C03b 33/02
[58] Field of Search ............................. 83/6–12, 74, 83/76, 362, 369, 370, 614, 341, 487, 295, 486, 486.1, 326

[56] References Cited
UNITED STATES PATENTS
3,282,140  11/1966  Sasabuchi et al. .................. 83/12 X
3,439,849  4/1969  Matsuzaki et al. .................. 83/10 X
3,581,615  6/1971  Kaneshige et al. .................... 83/295

*Primary Examiner*—Frank T. Yost
*Attorney, Agent, or Firm*—Sughrue, Rothwell, Mion, Zinn & Macpeak

[57] ABSTRACT

A cutter for cutting transversely continuously advancing sheet material is mounted for movement along a support extending across the sheet. A first detector detects the advancing position of the sheet and a second detector detects the position of the cutter along the support. Signals from the detectors are used to control drive means for moving the cutter along the support so that the cutter and sheet move in synchronism. Means is also provided to detect the speed of the sheet and speed of the cutter and provide control signals which are also used in controlling the cutter drive means.

16 Claims, 4 Drawing Figures

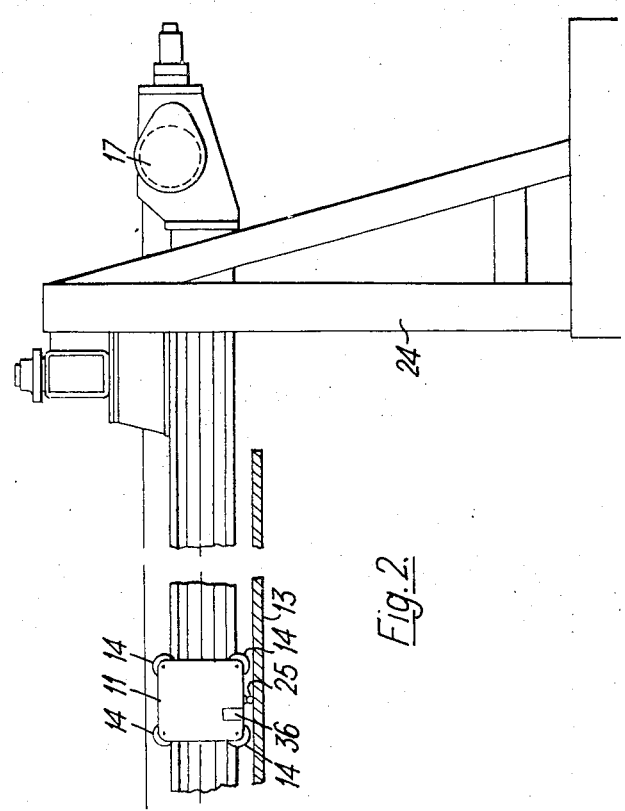
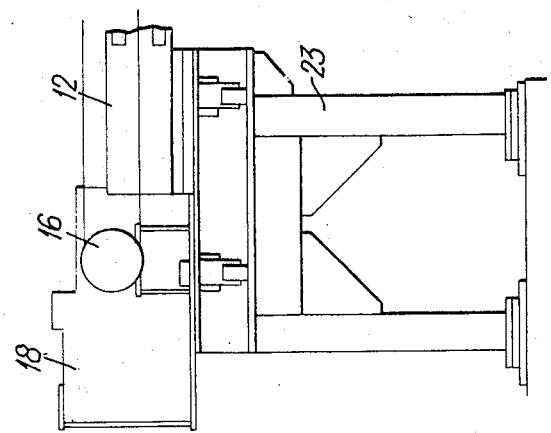
Fig. 2

SHEET APPARATUS FOR TRANSVERSELY CUTTING AN ADVANCING SHEET

BACKGROUND OF THE INVENTION

The invention relates to cutting apparatus and more particularly to apparatus for use in cutting transversely continuously advancing sheet material such as for example, a ribbon of glass at required intervals along the length of the sheet material.

When continuously advancing sheet material is cut transversely, a cutter may be moved across the ribbon to effect a cutting stroke at the same time as the ribbon moves forward. It will be understood that the cutter need not necessarily cause actual separation of the sheet along the cutting line but, particularly in the case of glass, may cause a score line or other line of stress to be formed so that separation may subsequently be effected by conventional means such as bending the sheet about the line of stress. The term cutter used in this specification includes cutting or scoring devices as well as other cutting tools, such as lasers, used to induce a line of stress in cutting sheet material. In order to obtain a straight cut at the required angle to the lateral edge of the sheet, it is necessary to move the cutter at a speed dependent on the speed of advance of the sheet. The speed of movement of the sheet may be detected and used to control a motor in an open loop system for moving the cutter across the sheet. If however irregularities are to be avoided in the cut line, difficulties can arise in providing a satisfactory driving connection between the motor and the cutter so that the cutter is always in the correct position throughout repeated and prolonged use.

SUMMARY

The present invention is concerned with the provision of cutting apparatus in which the accuracy of the cutter position as the sheet material advances is increased.

The present invention provides cutting apparatus for use in cutting continuously advancing sheet material such as a ribbon of glass, which apparatus comprises a movable cutter mounted for movement along a support adapted to extend across the sheet material from one lateral edge to the other, drive means for moving the cutter along the support, a first detector arranged to provide a signal dependent on the position of the advancing sheet material, a second detector arranged to provide a signal dependent on the position of the movable cutter along the support, and control means responsive to the signals from both the first and second detectors for controlling the drive means so that the position of the cutter along the support changes during a cutting operation in synchronism with movement of the sheet.

In order to help correct any positional error of the cutter during a cutting stroke, it is preferred that means is provided to detect the speed of movement of the sheet material and the speed of movement of the cutter along the support and the control means is arranged to control the drive means in dependence on the speeds of movement detected as well as the positions of the sheet and cutter.

Preferably an incremental control system is provided and the first and second detectors each comprise a digitiser arranged to provide a pulsed electrical output signal.

Preferably pulse counting means is provided and arranged to provide a count representing any error in position of the cutter along the support relative to the position of the sheet.

Conveniently, means is provided to convert the said count to an analogue electrical signal for use in controlling the drive means, and the means for detecting the speed of movement of the sheet material is arranged to provide a first electrical signal indicating the speed of the sheet and the means for detecting the speed of the cutter is arranged to provide a second electrical signal indicating the speed of the cutter, the first and second signals being arranged to have opposing effects on the control of the drive means. In this way, it can be arranged that increase of speed of the sheet material is used to boost the correction of any positional error of the cutter whereas increase in cutter speed reduces the correction effect of any positional error of the cutter.

In order to control the length of each cutting stroke of the cutter, a stroke length counter is preferably provided for receiving pulses from one of the detectors and controlling the length of stroke of the cutter.

In order that the apparatus may be preset to cut required lengths, a sheet length counter may be provided for receiving pulses from the first detector and operating the cutter when a preset number of pulses have been counted, in order to cut predetermined lengths from the advancing sheet.

In a preferred embodiment, a further counter is provided for receiving a delay signal operable to delay initiation of cutter movement after receiving a cutter start signal. Such a delay counter is particularly useful in synchronising the cutting operation of a number of cutters controlled by a single set of command signals.

Preferably the cutting apparatus can be computer controlled or manually controlled and a change-over selection switch is provided for selecting the mode of operation.

The invention also provides cutting apparatus for use in cutting continuously advancing sheet material such as a ribbon of glass, which apparatus comprises a movable cutter mounted for movement along a support adapted to extend across the sheet material from one lateral edge to the other, drive means for moving the cutter along the support, means for providing a first velocity signal dependent on the velocity of the sheet material, means for providing a second velocity signal dependent on the velocity of the cutter along the support, positional error detecting means for providing a signal dependent on any error in the position of the cutter relative to the position of the sheet, and control means for controlling the drive means of the cutter, the control means being arranged to respond to the first and second velocity signals and the positional error signal so as to provide a control signal representing the demanded velocity of the cutter and to control the drive means so that the cutter is moved at a velocity determined by said control signal.

BRIEF DESCRIPTION OF THE DRAWINGS

FIG. 2 is a view in the direction of the arrow A in FIG. 1;

DESCRIPTION OF THE PREFERRED EMBODIMENT

Figure 1:
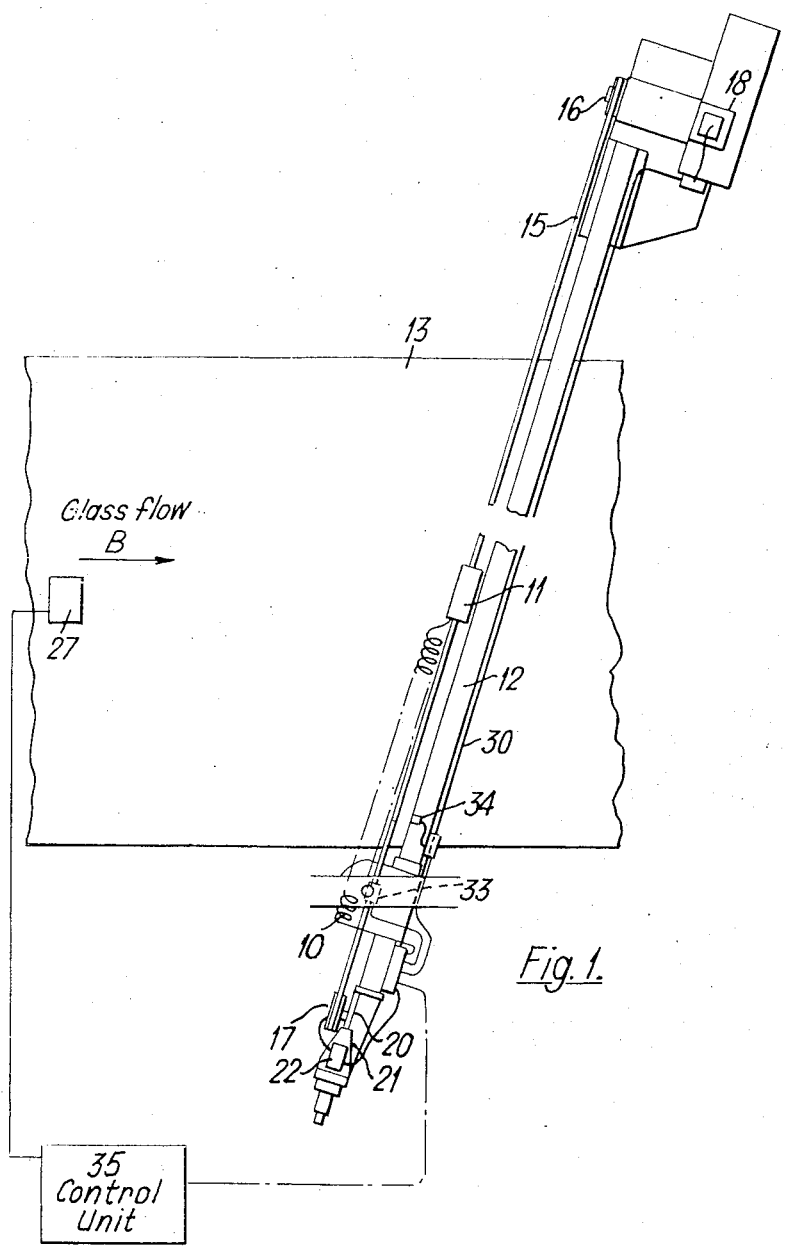
FIG. 1 is a plan view of cutting apparatus in accordance with the present invention.

In this example, the cutting apparatus includes a cutter assembly 11 mounted for movement along a support 12 which extends across and above continuously moving sheet material which in this example comprises a glass ribbon 13. The ribbon 13 moves at a substantially uniform speed in the direction of the arrow B. The support 12 extends across the entire width of the ribbon 13 so that the cutter assembly 11 may be moved from one lateral edge to the other of the ribbon 13. The length of the support 12 is inclined to the perpendicular direction across the ribbon 13 so that the assembly 11 may be moved through a cutting stroke at the same time as the glass ribbon 13 is moved forwards, and result in a straight cut perpendicular to the lateral edges of the ribbon 13. The assembly 11 has four wheels 14 at opposite corners which can roll along guide members on the support 12. The assembly 11 is fixed to a steel tape 15 which runs around pulleys 16 and 17. The pulley 16 is fixed to the output shaft of an hydraulic servo motor 18 used to drive the assembly 11 backwards and forwards across the glass ribbon 13. Attached to the pulley 17 is a toothed wheel 20 forming part of a digitiser arranged to provide a digital signal representing the position of the drive tape 15, and thereby the position of the cutter, at any instant. The toothed wheel 20 is formed of steel and has magnetised teeth which pass an adjacent magnetic pick-up head 21 coupled to an amplifier 22 to provide an output pulse for each unit of displacement of the tape 15. The assembly 11 is rigidly connected to the tape 15 so that the position of the cutter is always directly related to the position of the tape. As is shown in FIG. 2, the support 12 is mounted at opposite ends on further supports 23 and 24 so as to form a bridge across the ribbon path. The assembly 11 includes a cutting wheel 25 mounted so that the wheel may be raised or lowered as required by a pneumatic mechanism the operation of which is controlled by a solenoid. In the lowered position, the wheel is urged into contact with the upper surface of the glass ribbon 13 and scores the surface on moving across the ribbon. After scoring, the cut can be completed by flexing the glass sheet in a conventional manner to break the glass along the score line.

As is shown in FIG. 1, a further digitiser 27 is provided to detect the advancing position of the ribbon 13. The digitiser may have a rubber covered wheel rolling in contact with the upper surface of the glass sheet and actuating a signal generator so as to provide a series of output pulses representative of the position of the ribbon in the direction of the arrow B.

Figure 3:
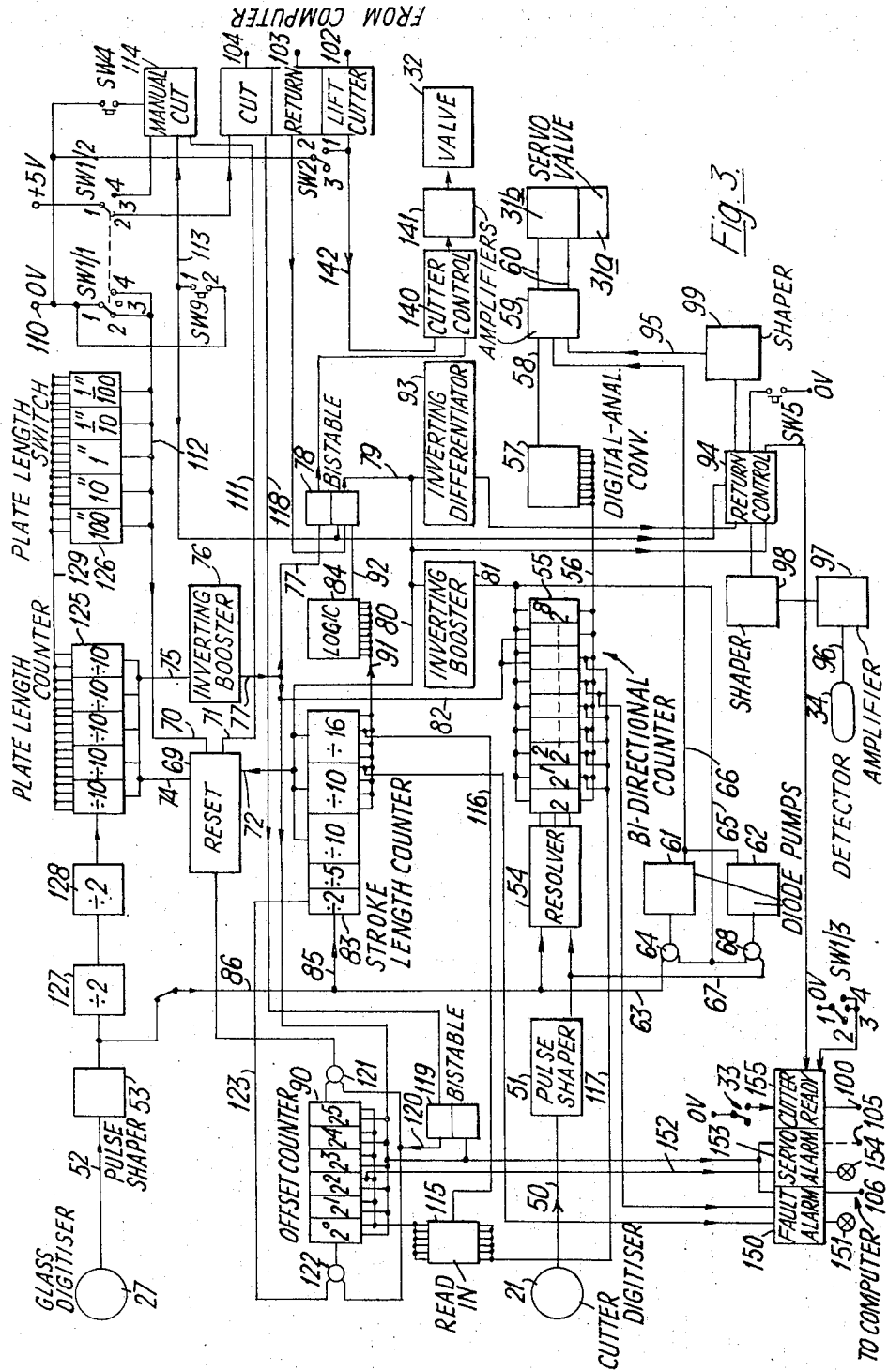
FIG. 3 is a schematic diagram of the control apparatus used with the apparatus of FIGS. 1 and 2.

The motor 18 receives a hydraulic supply along a pipe 30 under the control of a servo-valve 31a shown in FIG. 3, and operated by an electrical drive unit 31b. The cutting wheel 25 is raised or lowered pneumatically by a supply through a coiled supply pipe 10. The supply through the pipe 10 is controlled by a solenoid valve 32 shown in FIG. 3. FIG. 1 shows two devices to detect the position of the assembly 11. A switch 33 is located at the base or starting position for the cutter assembly 11. This position is to one side of the ribbon 13 and provides a starting point for the cutting stroke so that the assembly 11 moves a short distance towards the ribbon before reaching the first lateral edge of the ribbon. The switch 33 provides an indication when the assembly 11 is at the starting position. A detector 34 is provided a short distance along the support 12 from the switch 33. This detector is actuated by the assembly 11 when returning from the end of a cutting stroke to the start position. The assembly 11 is moved at high speed towards the starting position until it operates the detector 34 which then causes a progressive reduction in speed of movement of the assembly on approaching the start position. The digitiser 21 and devices 33 and 34 are connected to a control unit 35, by means of a multi-core connector, for controlling operation of the cutting apparatus. The digitiser 27 is connected by a separate connecting wire to the control unit 35.

An edge detecting unit 36 is coupled to the assembly 11 for detecting edges of the ribbon 13. This detector includes an infra-red source and a detector mounted at such an angle that if glass is present below the detector head, the infra-red from the source is reflected back up to the detector. When glass is present below the detector head a series of pulses appear at the output of the detector head and these are transmitted along a cable secured to the supply pipe 10 and fed to the control unit 35. This detector can be used to detect both lateral edges of the ribbon 13. This information can be used to control raising and lowering of the cutter wheel 25. Alternatively, it can be used to control other operations on the glass ribbon which require information regarding the position of the lateral edges.

The operation of the apparatus will now be described with reference to FIG. 3. In order to achieve a cut across the ribbon which is straight and square to the edge of the ribbon, the position of the assembly 11 must be accurately controlled in relation to the advancing position of the ribbon 13. The example described can be manually actuated or computer actuated. Alternatively it can be operated by preset local controls to give repeated operation in accordance with the presetting of the local controls. The basic operation of the apparatus is the same in each case although the source of the command signals differs. The cutter assembly digitiser 21 provides a series of pulses, representing the distance moved by the cutter, along a line 50 to a pulse shaper 51. Similarly the glass digitiser 27 provides a series of pulses on a line 52, representing the distance moved by the ribbon 13, and these pulses are fed to a pulse shaper 53. The two digitisers are suitably scaled so that both provide pulses at the same frequency when the relative velocities of the cutter and ribbon are correct for the particular angle of the support 12 across the ribbon. The pulses from both pulse shapers 51 and 53 are fed to a high speed resolver 54 which controls a bi-directional counter 55. The counter 55 counts a number of pulses representing any error in the position of the assembly 11 relative to the position of the ribbon 13. When pulses enter the resolver 54 alternately from each digitiser, there is no output from the resolver 54. Only when two pulses occur in one pulse train without an interposed pulse in the other train will there be an output fed into the counter 55. This enables the counter 55 to operate at lower speeds. Any number other than the datum value registered in the counter 55 indicates an error in the position of the cutter assembly 11 and consequently requires some adjustment in the operation of the servo motor 18. The output of the counter 55 is fed along a multi-core line 56 to a digital to analogue converter 57 which provides an analogue signal on line 58 to an amplifier 59. The output of the amplifier 59 on lines 60 controls the drive unit 31b of the servo-valve 31a to increase or decrease the speed of the motor 18 to correct, by adjusting the valve position and hence the flow to the motor 18, the position of the assembly 11 and thereby reduce the error counted in the counter 55. In this way, the positions of the assembly 11 and glass ribbon 13 are compared by comparing the pulse trains from the respective digitisers to provide a signal to the amplifier 59 representing any positional error of the cutter. In order to obtain smooth servo action, it is necessary to take into account the velocities of the glass ribbon 13 and assembly 11. To achieve this, two diode pumps 61 and 62 are provided. Pulses from the glass digitiser 27 are fed to the diode pump 61 along line 63. The line 63 leads to an AND gate 64 connected to the input of the diode pump 61 and arranged to be open when a signal on line 65 indicates that a cutting stroke is required. In this way, during a cutting stroke pulses from the glass digitiser 27 pass through the diode pump 61 which produces a current proportional to the velocity of the glass. The current from the diode pump 61 is fed along line 66 to the amplifier 59. To measure the velocity of the assembly 11, pulses from the cutter digitiser 21 are fed along line 67 to one input of an AND gate 68 connected to the input of diode pump 62. The other input of the AND gate 68 is connected to line 65 so that pulses from the cutter digitiser 21 are fed into the diode pump 62 when the appropriate signal is present on line 65. The output of the diode pump 62 is also fed along line 66 to the amplifier 59. In this way, the signals from the diode pumps 61 and 62 are applied to the input to the amplifier 59 with the positional error signal derived from the converter 57 so as to adjust the servo-valve 31a in dependance on both the positional error counted in the counter 55 and the velocities of the glass ribbon and cutter assembly. The current from the diode pump 62 is such as to tend to reduce the forward speed of the cutter assembly. This is necessary to produce stable servo action but tends to produce a positional lag of the cutter assembly behind its desired position. The sense of the current from the diode pump 61 is opposite to that of current from the diode pump 62 and is such as to tend to increase the forward speed of the cutter assembly. As the velocity of the cutter assembly is proportional to the opening of the servo-valve 31a, an output drive is required on line 60 to the drive unit 31 even when the positional error indicated by the counter 55 is zero. The glass velocity signal from the diode pump 61 provides this forward drive and also compensates for the lag which the velocity signal from the diode pump 62 would otherwise have caused.

Initiation of a cutting stroke is controlled by a reset generator 69. The reset generator, which comprises a monostable, has three triggering inputs 70, 71 and 73, as well as an inhibiting input 72. The rest generator must be triggered to initiate a cut and when this occurs, an output signal is fed along lines 74 and 75 through an inverting booster 76, formed by a transistor arranged to amplify and change the polarity of the signal, and along line 77 to switch a bistable 78. The bistable 78 is switched when the reset generator 69 is triggered and the change in signal on the output line 79 is fed via lines 80 and 72 back to the reset generator 69 so as to inhibit further triggering of the reset generator 69 until the cutting stroke is completed. Once the reset generator 69 has been triggered to initiate a cutting stroke, the change in output from the bistable 78 is fed on line 79 to an inverting booster 81, similar to the unit 76, and the output of the booster 81 is fed along line 65 to open the gates 64 and 68 leading to the diode pumps 61 and 62. This same change in output is also passed through the booster 81 to all stages of the counter 55, so as to free the latter for counting, it having previously been set to and held in its datum condition.

During a cutting stroke, pulses indicating lag of the cutting assembly 11 are added into the nine bit binary counter 55 and the output increases the forward drive on the cutter assembly. Similarly, pulses indicating lead of the cutter assembly are subtracted from the counter 55. If the counter 55 operated about a true zero, a sign determination would be required to differentiate a large positive number (a lag) from a small negative number (a lead) and vice versa. To avoid this, the counter 55 operates with an off-set datum of 207 (binary code 011001111). Under normal operating conditions, the cutter assembly will never have such a lead that it passes through to zero. The total capacity of the counter is $2^9$ which is sufficient to ensure that the counter is not over filled in normal operation.

To assist rapid lock on of the servo system at high cutting speeds (synchronisation of the position and required velocities of the cutter assembly and ribbon) upon initiation of a cut, the counter 55 is automatically set up with a signal equivalent to the cutter leading the glass by a predetermined amount. Whilst the cutter is gaining speed from rest, pulses will be generated continuously at full speed by the glass digitiser 27 and as a result, even when the cutter is up to speed, there would be an apparent positional error, since the cutter will not have travelled a distance equivalent to the glass travel. To avoid the servo unnecessarily seeking to adjust this apparent positional error, the counter 55 is set up as stated at the initiation of each stroke with an equivalent cutter lead. To this end, when a cut is required and the reset generator 69 is triggered to change the output of the bistable 78, pulses are applied from the inverting booster 76 along line 82 to bits $2^6$ and $2^7$ of the counter 55 so that the counter is then set to 15 (binary code 1111) giving the cutter assembly an apparent start of 192 digits. Under these conditions, the glass velocity signal from the diode pump 61 applied to the amplifier 59 is sufficient, even though opposed by the positional error signal, to drive the cutter assembly fowards and to accelerate it rapidly to about three-quarters the required velocity. By the time the cutter assembly has reached three-quarters of the required velocity, the glass ribbon position signal has caught up with the apparent cutter assembly position, as registered by counter 55, so that a smooth lock on results. During the rest of the cutting stroke the forward drive on the cutter assembly is adjusted by the servo-valve 31a in dependance on the number counted in the counter 55 and the glass and cutter velocity signals, so as to achieve the required straight line cut. The length of the cutting stroke is determined by a stroke length counter 83 and associated logic circuits 84. The circuits 84 comprise a NAND gate and a pin board on which a desired stroke length can be set by making suitable physical connections. The NAND gate has eight inputs, four connected to the pin board and four connected to the stroke length counter 83. When the count in counter 83 matches the count represented by the pin board connections, the NAND gate included with the circuit 84 provides an output pulse which is applied to re-set the bistable 78 thus bringing about termination of the cut.

When a cut is initiated, the reset signal from the bistable 78 which had previously been fed along lines 79 and 80 to clear the counter 83, is switched to its other level and the counter 83 starts counting pulses from the glass digitiser 27 giving the demanded position of the cutter assembly 11. These pulses are fed into the counter 83 along the lines 85 and 86 from the pulse shaper 53. The counter 83 counts pulses from the glass digitiser 27 rather than the cutter assembly digitiser 21 as counting pulses from the digitiser 21 would prevent alarm being raised in the case of total failure of the cutter drive mechanism. The re-set signal from the bistable 78 is not applied to the first decade of the counter 83 as the output of the first binary stage of the counter 83 is required for an off-set counter 90 (to be described below) before a cut is initiated. The number counted in the significant stages of the counter 83 is fed along multicore line 91 to the logic circuits 84 and when this number reaches the pre-set number in the circuits 84, and output signal is provided on line 92 to the bistable 78 which changes the state of the bistable and inhibits further forward drive movement by the valve 31a. It does this by the re-set signal on line 79 passing through the inverter 81 causing closure of the AND gates 64 and 68 and also re-sets the counter 55 to its datum position. Simultaneously, the signal on line 79 passes through an inverting differentiator 93 which sends a pulse to a return control unit 94 which comprises a bistable connected to a shaper 99. The return control unit 94 provides an output signal through the shaper circuit 99 in line 95 leading to the amplifier 59 which causes the servo-valve 31a to drive the hydraulic motor in the reverse direction to return the cutter assembly 11 to the starting position. The return stroke is not servo controlled. When the cutter assembly passes the magnetic detector 34, a signal is supplied along line 96 to an amplifier 97 and through a shaper 98 to the return control unit 94. This signal is used to slow down the rate of return movement of the cutter assembly. The shaper 99 includes a capacitative circuit with a diode in parallel with a resistor so that the circuit responds with a different time constant to step inputs of opposite polarity. The step input from the control unit 94 to initiate return movement of the cutter is of such polarity that a signal passes without delay to the amplifier 59. When however the bistable 94 switches back in response to a signal from the detector 34, it provides a step output of opposite polarity and the shaper 99 responds with a much longer time constant so that the signal applied to the amplifier 59 slowly changes, progressively reducing the return signal and thereby decelerating movement of the cutter assembly towards the starting position until the assembly comes to rest gently on a back stop at the starting position. At this point, the cutter assembly operates the switch 33 which provides a "cutter ready" signal on a terminal 100 for feeding into a computer controlling the apparatus.

As already mentioned, the apparatus may be operated in three alternative modes. In one mode the apparatus is computer actuated and for this purpose input terminals 102, 103, and 104 are provided for receiving signals from the computer and output terminals 105, 106 and 100 are provided for supplying information to the computer. A selecting device comprising two ganged switches SW1/1 and SW1/2 are provided for selecting the mode of control of the apparatus. As shown in FIG. 3, each of the switches has three possible settings, position 2 of each switch corresponding to automatic (computer) control, position 3 corresponds to "local" control in which the apparatus operates in accordance with locally preset conditions, and setting 4 corresponds to manual control. When the selector device is set for manual control, a press button SW4 must be depressed to initiate a cut. This connects a zero volt terminal 110 to the input of a manual cut unit 114 which is a pulse generator and responds by providing a triggering pulse on line 111 leading to the input 71 of the reset generator 69. The cutting stroke then proceeds and is terminated as already described.

Figure 4:
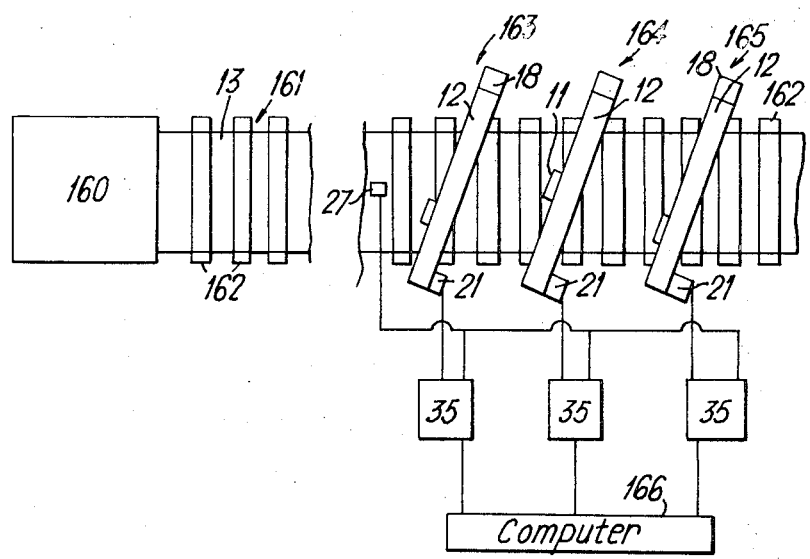
FIG. 4 is a schematic view of a glass manufacturing line including a number of cutters as shown in FIG. 1.

When the apparatus is computer controlled, the off-set counter 90 is used. A schematic view of a glass forming and cutting line which is computer controlled is shown in FIG. 4. In this case, a continuous ribbon of glass 13 leaves a ribbon forming unit 160 which may for example comprise a float bath. A conveyor 161 comprising a plurality of conveyor rollers 162 extends away from the forming unit and continuously moves the ribbon forward in a horizontal plane. At a suitable position downstream on the conveyor 161 a succession of cutting devices of the type shown in FIGS. 1 and 2 are provided. In FIG. 4, three cutting devices 163, 164 and 165 are shown, although it will be appreciated that more, or less, cutting devices may be provided as required. Each cutting device includes a support beam 12, cutter 11, cutter digitiser 21, cutter motor 18 and control unit 35 as already described. As shown the support beams 12 are arranged parallel to each other at suitable spaced intervals along the length of the ribbon, but this is not essential and in some cases the beams may be at different angles. Each control unit is coupled to the one common glass digitiser 27 and is actuated by a computer 166 coupled to each control unit 35. This arrangement using a succession of cutting devices on the same ribbon is advantageous in allowing short lengths to be cut from the ribbon. In some cases the plane lengths required may be so short that one cutter alone would be required to start a new cutting line before completing a previous cutting line and the FIG. 4 arrangement avoids this difficulty. However when a number of cutting devices are in use to produce short plates, errors in the plate length achieved by the separate cutting devices can arise due to slight differences in the characteristics of the individual servo systems. Reverting to consideration of one of the cutting devices, the off-set counter 90 serves as a variable delay between the computer 166 calling for a cut and the execution of the command. If a cutter assembly 11 is lagging so that the cut is late, the counter 90 for that cutter compensates by calling for the cut earlier so that differences between the various cutting devices can be compensated by the adjustable delay in each of the off-set counters 90. The adjustable delay signal is fed into the counter 90 in digital form through a read in device 115. The device 115 consists of a plurality of AND gates each having two inputs and one output. The outputs are connected to the off-set counter 90. One input of each gate is connected to an appropriate stage of the counter 55 while the other input is connected through a monostable to the line 116. The read in device 115 receives a timing signal along line 116 from the next to the last stage of the stroke length counter 83. It receives a second input along multicore line 117 from the output of the bi-directional counter 55. In this way, the error signal in the counter 55 is transferred to the off-set counter 90 about half way through the cutting stroke. This number is stored in the off-set counter 90 until the beginning of the next cutting stroke. When the computer commands initiation of a cut, a cut command signal is applied at terminal 104 and is fed along line 118 to a set/reset bistable 119. The change in output on line 120 then opens AND gates 121 and 122. The other input to the AND gate 121 is the output of the counter 90. The other input to the AND gate 122 is an output from the first binary stage of the counter 83. As the contents of the first bit of the counter 55 are not transferred to the off-set counter 90, the counter 90 must be fed with pulses at half the frequency of the pulses on the line 86 and the signal on line 123 provides this. When the computer gives the signal to start a cut, the counter 83 starts counting pulses from the glass digitiser 27 and provides pulses along line 123 to the AND gate 122. This thereby provides input pulses to the off-set counter 90 which adds them to the number already counted in the counter 90. When the counter 90 is full, an output signal is applied through the AND gate 121 along the line 73 to trigger the reset generator 69 and cause movement of the cutter assembly as already described. It will be seen that the delay between the cutter command signal from the computer and triggering of the reset generator 69 is dependent on the number already stored in the off-set counter 90 at the time the cut command signal is given. When reset generator 69 is triggered, the change in output from the bistable 76 resets the bistable 119 and clears the offset counter 90. The number in the off-set counter 90 is up-dated each time the cutter moves through a cutting stroke although the off-set counter 90 is only of effective use when the apparatus is on automatic control selected by the switches SW1/1 and SW1/2.

In some cases it is possible to use a single preset delay in place of the off-set counter 90 particularly in the case of cutting apparatus with low positional error of the cutter.

When the selecting switches SW1/1 and SW1/2 are set to "local" control, the apparatus can be operated to cut predetermined lengths from the ribbon. To achieve this, a plate length counter 125 and plate length switch 126 are provided. The required length of glass ribbon between each cut can be pre-set on the plate length switch 126. Pulses from the glass digitiser 27 are counted down by a factor of four by two dividers 127 and 128 and the output of divider 128 is fed into the plate length counter 125. The number counted in the counter 125 is fed along multicore line 129 to the plate length switch 126. When the number counted reaches that pre-set on the switch 126, the output of the switch 126 which is connected to line 112, causes a triggering pulse on line 70 to trigger the reset generator 69 and initiate a further cut, as already described. Each time the reset generator 69 is triggered, the output signal on line 74 resets the plate length counter 125.

When the selector switch SW1/1 is turned to position 3, corresponding to "local" control, line 110 is not connected to line 112. This is to allow line 112 to go positive when the plate length counter 125 reaches parity with the setting on the plate length switch 126 and so trigger the reset generator 69. In positions 2 and 4 of switch SW1/1 line 110 is connected to line 112 to inhibit the plate length counter from triggering the reset generator.

A manual return button SW5 is provided and this, when depressed, feeds a signal to the return contorl unit 94 which causes return of the cutter to the start position. In addition a reset switch SW9 is provided to enable the circuits to be reset to their datum condition. The switch SW9 connects the zero volt terminal 110 to a line 113 leading to the bistable 78 and return control 94. When closed the switch SW9 resets the bistable 78 and return control 94 and this in turn resets the other circuits associated with them.

The solenoid valve 32, which includes an electrical drive unit, for raising and lowering the cutting wheel is controlled by a raise/lower control unit 140 through an amplifier 141. The control unit 140 receives one input from the control bistable 78 and another input from line 142. A raise or lower signal can be applied to line 142 by the computer terminal 102 or alternatively by operation of the switch SW2. In this way, when a cut command signal has been provided, the cutter can be lowered before reaching the edge of the glass ribbon 11 and then the bistable 78 is changed over by the gate 84 at the end of the cutting stroke, the control unit 140 causes the cutting wheel to be raised.

If an interrupted cut is required (that is for the cutter to be raised and inoperative for one or more parts of a full stroke across the ribbon) a more complex input is required on terminal 102 to raise and lower the cutter at the appropriate points in the stroke.

If the digital to analogue converter 57 saturates during the cut, servo action will be impaired. This is most likely to occur during the initial few inches of the cutter movement. A fault alarm unit 150 having a warning light 151 and terminal 106 is connected to the output of the counter 55 and to the stroke length counter 83 to determine whether the error in counter 55 is within predetermined limits after the cut has proceeded to the point where 800 pulses have been counted in counter 83. If it is not, an alarm signal is provided. Such an alarm signal is cancelled at the beginning of the next cutting stroke by a signal from the booster 76. If drift occurs so that the off-set signal fed to the counter 90 is beyond predetermined limits, a warning signal is fed along line 152 to a servo alarm unit 153 having a warning light 154 and output terminal 105. This alarm condition is cancelled at the beginning of the next cutting stroke by a signal from the booster 76. A "cutter ready" unit 155 provides a signal for the computer on terminal 100 when the cutter is ready for a further cutting stroke. The cutter ready unit 155 receives inputs from the switch 33, a further switch SW1/3 (ganged to the switches SW1/1 and SW1/2) as well as inputs from the cutter return control unit 94. In this way, a cutter ready signal is only provided when the mode selector switch is in position 2, the cutter is at the starting position and the return drive is off.

The cutter assembly 11 may be as shown and described in our co-pending application Ser. No. 159124. Alternatively, other types of cutting or scoring devices may be used.

We claim:

1. Cutting apparatus for use in cutting continuously advancing sheet material such as a ribbon of glass, which apparatus comprises a movable cutter mounted for movement along a support adapted to extend across the sheet material from one lateral edge to the other, a drive means for moving the cutter along the support, a first detector arranged to provide a signal dependent on the position of the advancing sheet material, a second detector arranged to provide a signal dependent on the position of the movable cutter along the support, and control means responsive to signals from both the first and second detectors for controlling the drive means so that the position of the cutter along the support changes during a cutting operation in synchronism with movement of the sheet.

2. Cutting apparatus as claimed in claim 1, in which the control means is arranged such that the synchronism between movement of the cutter and movement of the sheet produces a straight cutting line extending perpendicular to the lateral edge of the sheet.

3. Cutting apparatus as claimed in claim 1, in which means is provided to detect the speed of movement of the sheet material and the speed of movement of the cutter along the support and the control means is arranged to control the drive means in dependence on the speeds of movement detected as well as the positions of the sheet and cutter.

4. Cutting apparatus as claimed in claim 1, in which the first and second detectors each comprise a digitiser arranged to provide a pulsed electrical output signal.

5. Cutting apparatus as claimed in claim 4, in which pulse counting means is provided and arranged to provide a count representing any error in position of the cutter along the support relative to the position of the sheet.

6. Cutting apparatus as claimed in claim 5, in which means is provided to convert the said count to an analogue electrical signal for use in controlling the drive means, and the means for detecting the speed of movement of the sheet material is arranged to provide a first electrical signal indicating the speed of the sheet and the means for detecting the speed of the cutter is arranged to provide a second electrical signal indicating the speed of the cutter, the first and second signals being arranged to have opposing effects on the control of the drive means.

7. Cutting apparatus as claimed in claim 6, in which the speed detecting means each comprise a diode pump circuit arranged to switch at a frequency determined by the frequency of pulses from the associated digitiser and provide a current proportional to that frequency.

8. Cutting apparatus as claimed in claim 1, in which the drive means comprises an hydraulic motor and the control means includes a servo-valve.

9. Cutting apparatus as claimed in claim 1, in which a return device is provided to return the cutter to a starting position at one end of the support when the cutter has effected a cutting stroke and traversed the sheet.

10. Cutting apparatus as claimed in claim 9, in which means is provided near the starting position to detect return movement of the cutter and slow down the return movement on approaching the starting position.

11. Cutting apparatus as claimed in claim 4, in which a stroke length counter is provided for receiving pulses from one of the detectors and controlling the length of stroke of the cutter.

12. Cutting apparatus as claimed in claim 4, in which a sheet length counter is provided for receiving pulses from the first detector and operating the cutter to cut predetermined lengths from the advancing sheet.

13. Cutting apparatus as claimed in claim 11, in which a further counter is provided for receiving a delay signal operable to delay initiation of cutter movement after receiving a cutter start signal.

14. Cutting apparatus as claimed in claim 1, in which manual or computer control is provided and a selection switch is arranged for selection of the mode of operation.

15. Cutting apparatus as claimed in claim 1, in which the cutter is adapted to be moved in contact with the sheet material and in which means is provided for raising and lowering the cutter when required.

16. Cutting apparatus for use in cutting continuously advancing sheet material such as a ribbon of glass, which apparatus comprises a movable cutter mounted for movement along a support adapted to extend across the sheet material from one lateral edge to the other, drive means for moving the cutter along the support, means for providing a first velocity signal dependent on the velocity of the sheet material, means for providing a second velocity signal dependent on the velocity of the cutter along the support, positional error detecting means for providing a signal dependent on any error in the position of the cutter relative to the position of the sheet, and control means for controlling the drive means of the cutter, the control means being arranged to respond to the first and second velocity signals and the positional error signal so as to provide a control signal representing the demanded velocity of the cutter and to control the drive means so that the cutter is moved at a velocity determined by said control signal.

* * * * *